United States Patent [19]

Halene

[11] Patent Number: 4,995,235
[45] Date of Patent: Feb. 26, 1991

[54] METHOD AND APPARATUS FOR COMPRESSING HYDROGEN GAS

[75] Inventor: Clemens Halene, Düsseldorf, Fed. Rep. of Germany

[73] Assignee: Huit Gesellschaft Fur-Hydrid-Und Wasserstofftechnik m.b.H., Fed. Rep. of Germany

[21] Appl. No.: 325,267

[22] Filed: Mar. 17, 1989

[30] Foreign Application Priority Data

Mar. 17, 1988 [DE] Fed. Rep. of Germany ....... 3809680

[51] Int. Cl.$^5$ ............................................. F17C 11/00
[52] U.S. Cl. ............................... 62/46.2; 165/104.12; 423/658.2
[58] Field of Search ............................ 423/248, 658.2; 165/104.12; 62/48.1, 114, 46.2

[56] References Cited

U.S. PATENT DOCUMENTS

| | | | |
|---|---|---|---|
| 3,516,263 | 6/1970 | Wiswall, Jr. et al. | 62/48 |
| 4,039,023 | 8/1977 | McClaine | 165/2 |
| 4,108,605 | 8/1978 | Billings | 423/248 |
| 4,178,987 | 12/1979 | Bowman et al. | 165/104.12 |
| 4,188,795 | 2/1980 | Terry | 165/104.12 |
| 4,200,144 | 4/1980 | Sirovich | 165/104.12 |
| 4,360,505 | 11/1982 | Sheridan et al. | 423/658.2 |
| 4,402,187 | 9/1983 | Golben et al. | 423/248 |
| 4,444,727 | 4/1984 | Yanagihara et al. | 423/248 |
| 4,505,120 | 3/1985 | Golben | 62/46.2 |
| 4,523,635 | 6/1985 | Nishizaki et al. | 165/104.12 |
| 4,607,826 | 8/1986 | Ron | 266/251 |
| 4,631,170 | 12/1986 | Ohnishi et al. | 420/455 |

FOREIGN PATENT DOCUMENTS 78401 6/1981 Japan ................... 423/248

OTHER PUBLICATIONS

European Patent Application 0220678, published May 1987.

Primary Examiner—Wayne A. Langel

[57] ABSTRACT

An apparatus for compressing hydrogen gas includes a hydrogen source, a hydrogen receiver, and a pair of hydride reservoirs. Each of the hydride reservoirs is capable of reacting with hydrogen gas therein and includes a jacket for the receipt of a heating and cooling medium therein. Each of the hydride reservoirs selectively receives the hydrogen gas from the hydrogen source and discharges the hydrogen gas to the hydrogen receiver. A heat pump means is operably connected to each of the hydride reservoirs by way of the heating and cooling medium for selectively cooling one of the hydride reservoirs while heating the other hydride reservoir and heating the one hydride reservoir while cooling the other hydride reservoir. There is also included a method of compressing hydrogen gas by using at least one hydride reservoir and a heat pump for transferring heat thereto and therefrom.

24 Claims, 4 Drawing Sheets

METHOD AND APPARATUS FOR COMPRESSING HYDROGEN GAS

BACKGROUND OF THE INVENTION

1. Field of the Invention:

This invention relates to a method and apparatus for compressing hydrogen gas and, more specifically, to such a method and apparatus which employs one or more hydride reservoirs operably connected to a heat pump for compressing the hydrogen gas.

2. Description of the Prior Art:

German Patent Publication Published for Opposition Purposes No. 26 41 487 discloses a process for the compression of hydrogen gas using a hydride reservoir, in which the hydrogen gas is initially introduced into the hydride reservoir under low pressure. The heat (binding enthalpy) released by the ensuing hydride formation (hydrogenation phase) is continuously removed from the hydride reservoir by means of a coolant. After the maximum reservoir discharge is achieved, the hydride reservoir is heated so that the hydrides formed begin to decompose again (dehydrogenation phase), and the hydrogen gas pressure in the hydride reservoir increases to a maximum (equilibrium pressure). The compressed hydrogen produced in accordance with the above-referenced patent is used to operate a flash gas turbine to produce electrical energy, and circulates in a closed circuit. To heat the hydride reservoir, the flow of a heating medium at a temperature of less than 232 degrees C. is used. The application of the prior art assumes that the fluid flows for the cooling and heating medium are automatically available and cannot be efficiently used in any other manner.

The prior art also includes the operation of hydride reservoirs merely for the purpose of hydrogen compression. If there are particular requirements for the purity of the hydrogen gas, impurities which are caused by the presence of lubricants in mechanical compressors can thereby be prevented.

The required coolant flow (heat sink) for the hydrogenation phase can, as a rule, be relatively economically provided in the form of surface or well water. However, the supply of the heating medium flow (heat source) for the dehydrogenation phase, in the form of primary energy or electrical energy, is generally more expensive, since it cannot be automatically assumed that an appropriate source of waste heat, for example, will be available free of cost, As a rule, therefore, a conventional heating unit (instantaneous water heater) is used to produce hot water. In addition to the energy expense, this process also involves expenses for water treatment.

OBJECT OF THE INVENTION

It is an object of the invention therefore to provide an installation to compress hydrogen gas.

It is another object to provide such an installation which entails as little expense for operating energy as possible.

SUMMARY OF THE INVENTION

These and other objects of the invention are provided in a preferred embodiment thereof including the lines of the media flow for the alternating cooling and heating of the hydride reservoir or reservoirs being designed as closed circuits, so that a continuing expenditure for water treatment, for example, is no longer necessary. Moreover the aggregate (heat pump) used as the heat source is simultaneously used as the heat sink. The cooling capacity of the heat pump, which during normal operation of a heat pump as a heating aggregate is considered an unfavorable effect (from an environmental point of view), is directly used for the industrial hydrogenation/dehydrogenation process.

While the heat of the binding enthalpy of the metal hydride and the internal heat of the hydride reservoir is "pushed back and forth" between the hydrogenation and dehydrogenation phases, the only energy which needs to be introduced into the process from outside is the energy required for the compression work itself, in the form of the drive energy for the heat pump. The apparatus according to the invention makes it possible to achieve higher hydride reservoir charges compared to the apparatus of the prior art, since the temperature of the heat sink which, for example, can be significantly lower than the temperature of well water is a function of the coolant selected for the internal circuit of the heat pump. A lower reservoir temperature, at the same charging pressure, leads to a higher hydrogen concentration.

When the hydride reservoirs are used in pairs for hydrogen compression and the individual hydride reservoirs of a pair work in opposite modes, the binding enthalpy released in the hydrogenation phase of the one hydride reservoir can be used simultaneously in the dehydrogenation phase of the other hydride reservoir. If, on the other hand, there is only one hydride reservoir, or if there are several hydride reservoirs operated in the same mode, an intermediate reservoir for cooling or heating must always be included in the cooling or heating circuit. The heat pump is then indirectly coupled through this intermediate reservoir with the two circuits.

A particularly effective solution with regard to the heat exchange can be achieved if the coolant of the internal circuit of the heat pump is transported through the jacket of a pair of hydride reservoirs operated in opposite modes. In this case, the cooling circuit and the heating circuit of the hydride reservoir are integrated with the internal circuit of the heating pump into a single circuit, so that the jackets of the hydride reservoir act as the condenser or the evaporator of the heat pump.

To achieve the maximum compression pressures, the apparatus in accordance with the invention can also be designed so that the process is conducted in several stages. The hydrogen, already under high pressure from the previous hydride reservoir, is thereby conducted to the hydride reservoirs of a subsequent stage, so that very high hydrogen concentrations can be achieved. The heating of a hydride reservoir highly charged in this manner leads to extraordinarily high equilibrium pressures. Of course, the pressure level can also be influenced by a suitable choice of the hydride metal and by the temperatures of the heating and cooling circuits.

A particularly effective mode of operation results in a compressor apparatus with hydride reservoirs in pairs, if there is a short circuit line which can be opened by a valve between the hydride reservoirs operated in opposite modes. At the end of a dehydrogenation phase, as a rule, there is still a considerable quantity of hydrogen gas available in the "discharged" hydride reservoir at a high pressure as compared with the pressure of the uncompressed hydrogen gas available. After the closing of the hydrogen inlet valve in the hydrogen feed line of the initially "charged" hydride reservoir, the valve of this short circuit line is opened. As a result, there is a pressure equalization in both reservoirs, so that an additional amount of hydrogen overflows from the already "discharged" hydride reservoir into the "charged" hydride reservoir. In this manner the amount of compressed hydrogen which can be released in one charge/discharge cycle is significantly increased.

Still further, if, during this "short circuiting", the cooling circuit and the heating circuit are disconnected, there is another advantage for the next operating cycle of the two hydride reservoirs. There is a reduction of the hydrogen pressure in the "discharged" hydride reservoir which leads to an additional release of hydrogen gas (falling equilibrium pressure) and thus automatically and extraordinarily rapidly to a cooling of this previously heated hydride reservoir, so that this hydride reservoir has already switched into the cooling phase for the next recharging process.

Conversely, the additional feed of hydrogen under the increased pressure in the "charged" and therefore cooled hydride reservoir leads to an additional charging because of the increase of the equilibrium pressure. As a result of the heat released during the hydrogenation, this hydride reservoir is heated very rapidly. Therefore, the changeover of the two hydride reservoirs between the hydrogenation and dehydrogenation phase is accelerated to an extraordinary degree.

Basically, the objects of the invention are provided by an apparatus for compressing hydrogen gas which includes a hydrogen source; a hydrogen receiver, and at least one hydride reservoir. The hydride reservoir is for receiving the hydrogen gas from the hydrogen source and for discharging the hydrogen gas to the hydrogen receiver. The hydride reservoir includes a jacket for supplying a heating and cooling medium thereto and for discharging a heating and cooling medium therefrom. There is included a heat sink. A heat pump is operably connected through the heating and cooling medium to the jacket of the hydride reservoir and to the heat sink for selectively cooling the hydride reservoir while heating the heat sink and heating the hydride reservoir while cooling the heat sink.

Additionally, there is a method of compressing hydrogen gas including the steps of supplying hydrogen gas at a first pressure to at least one hydride reservoir; transferring heat with a heat pump between the hydride reservoir and a heat sink to cause the hydrogen gas to be absorbed in the hydride reservoir; transferring heat with the heat pump between the hydride reservoir and the heat sink to cause a discharge of the hydrogen gas at a second pressure which is higher than the first pressure; and removing the hydrogen gas at the second pressure from the hydride reservoir.

DESCRIPTION OF THE PREFERRED EMBODIMENTS

Figure 1:
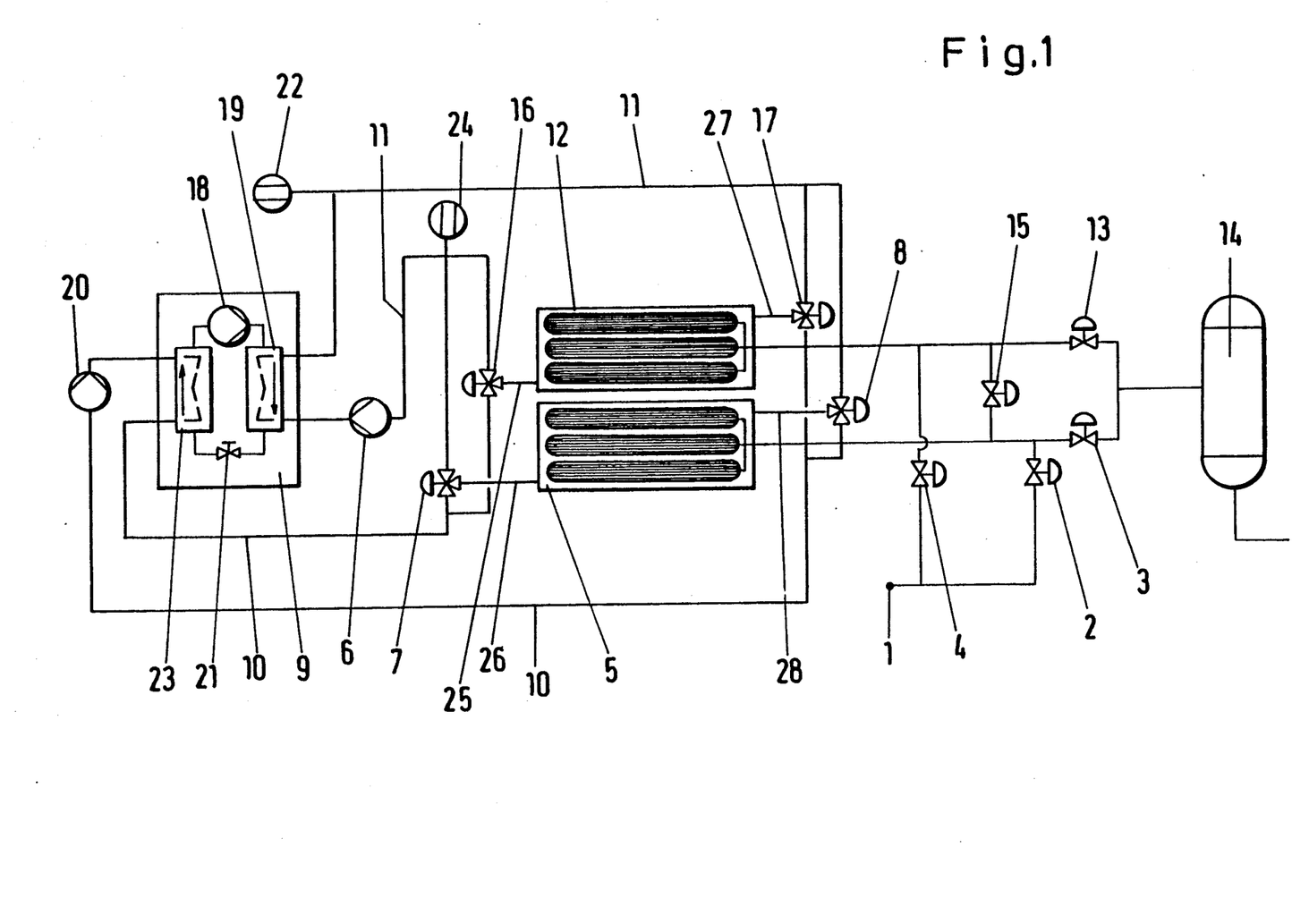
FIG. 1 is a schematic diagram of a preferred compressor apparatus in accordance with the invention with a separate heating and cooling circuit.

The compressor portion of the apparatus illustrated in FIG. 1 consists of two hydride reservoirs 5 and 12 connected in parallel, which are operated in opposite modes with regard to their charge and discharge cycles. They are identical in structure, so that the amounts of heat of the hydride binding enthalpy are the same for both of them.

To charge the hydride reservoir 5, for example, hydrogen gas at a low pressure, for example, 2 bar, is taken from a hydrogen source or storage container (not shown) and introduced into the compressor apparatus via the line 1. The valves 3, 4 and 15 are closed, so that hydrogen gas flows through an open valve 2 into the hydride reservoir 5 and forms a metal hydride with the metallic reservoir charge. This process is accompanied by a release of heat. At the same time, the hydride reservoir 12, which is charged with hydrogen, is discharged via the valve 13, in order to charge a hydrogen receiver means or compressed gas container 14. The compressed gas container 14 can therefore be considered a source the compressed hydrogen for eventual use by a consumer.

To assist in the hydride formation (hydrogenation phase), the heat which is formed must be removed. Therefore, while the hydride reservoir 5 must be cooled, heat is required in the hydride reservoir 12 for the dehydrogenation in order to release the hydrogen gas under increased pressure. As will be seen, in one embodiment of the invention each hydride reservoir 12, 5 will serve as a heat sink means for the other hydride reservoir 5, 12.

To meet this requirement for heating and cooling, there are a heating circuit 11 and a cooling circuit 10, each of which represents a complete system in itself. The heating circuit 11 and the cooling circuit 10 can be respectively altered to include one hydride reservoir means including the hydride reservoir 5 and the heat transfer jacket thereof and the other hydride reservoir means including the hydride reservoir 12 and the heat transfer jacket thereof.

While the cooling circuit 10 is connected to the heat exchange or evaporator 23 of the heat pump 9 which absorbs heat externally, the heating circuit 11 is connected to the heat exchanger 19 of heat pump 9 which gives off heat externally. Water with antifreeze is used in both circuits as a heating and cooling medium. The cooling water is transported by the circulation pump 20 through the evaporator 23. Because of its indirect contact with the coolant the internal circuit of the heat pump 9, the coolant evaporates to release heat and leave the heat exchanger 23 at a lower temperature, for example, about −10 degrees C. By way of the valve 7, the cooling water is transported through the line 26 into the jacket of the hydride reservoir 5 which has just been charged, cools the hydride reservoir 5 and leaves the jacket of the hydride reservoir 5 at an increased temperature. The coolant then passes through the line and the valve 8 toward the evaporator 23, where it again gives up the heat it has absorbed.

The heat is raised to a higher temperature level by means of the internal coolant circuit of the heat pump 9, which has a compressor 18 and a throttle 21. The heat is then transported by means of the heat exchanger or condenser 19 to the water in the heating circuit 11, which is kept in motion by the circulation pump 6. The water which is raised to a higher temperature, for example, about 60 degrees C., in the condenser 19 enters the jacket of the hydride reservoir 12 through the valve 17 and the line 27 and gives up its heat for the dehydrogenation of the contents of the reservoir. The heating water leaves the jacket of the hydride reservoir 12 with a correspondingly reduced temperature through the line 25 and the valve 16 to return the condenser 19 to once again absorb heat therein. The heat transfer from the hydride reservoir 5 by the heat pump 9 to the hydride reservoir 12 continues until the hydride reservoir 5 has reached its maximum charge according to the achievable reservoir cooling and the feed pressure which is available for the hydrogen gas storage container and the hydride reservoir 12 is discharged to the specified degree. Because of the high temperature of the hydride reservoir 12, its discharge pressure is very high, for example, about 50 to about 200 bar. The energy required beyond the pure binding enthalpy for the compression of the hydrogen is introduced into the system by way of the power to drive the heat pump 9 as the excess heat from one hydride reservoir is transported to the other hydride reservoir where it is needed. When the charging and discharging processes are completed, the valves 7, 8, 16 and 17 are reversed, so that the hydride reservoir 5, including the jacket thereof, is connected to the heating circuit 11 and the hydride reservoir 12, including the jacket thereof, is connected to the cooling circuit 10. Simultaneously, the hydrogen gas valves 2, 3, 4 and 13 are reversed so that the compressed hydrogen is released from the hydride reservoir 5 by way of the valve 3, and simultaneously the hydride reservoir 12 is recharged. To protect the heating circuit 11, there are expansion vessels 22 and 24.

Figure 3:
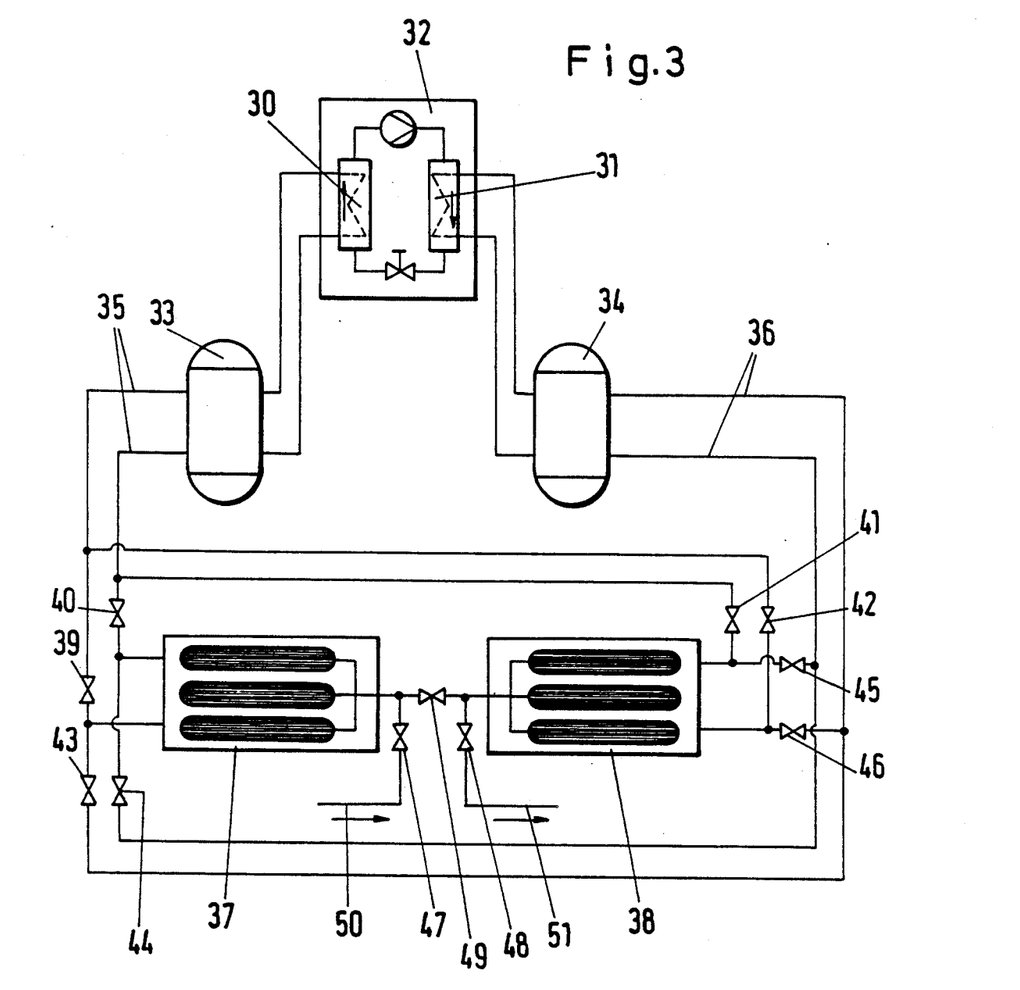
FIG. 3 is a schematic diagram of a two-stage compressor apparatus with an intermediate heat and cold reservoir including various features of the invention.

In contrast to the direct "heat shift" between identical hydride reservoir means described above which are operated in opposite modes, the energy-conserving use of a heat pump can also be employed by taking advantage of both its heating and cooling capacity even with only one hydride reservoir or with several hydride reservoirs operated in opposite modes. For this purpose, all that is required is an indirect coupling of the evaporator and the condenser of the heat pump with the cooling and heating circuit respectively. The indirect coupling is preferably provided by heat sink means in the form of an intermediate cold reservoir and an intermediate heat reservoir respectively which are included in the cooling circuit and the heating circuit, so that there is separation in terms of time between the heating and cooling requirement. FIG. 3 shows such an intermediate cold reservoir 33 connected with the evaporator 30 and an intermediate heat reservoir 34 connected with the condenser 31 of a heat pump 32 and will be discussed in detail below.

The valve 15, as seen in FIG. 1, makes it possible to produce a pressure equalization between the two hydride reservoirs 5 and 12. This leads to an overflowing or transferring of hydrogen gas from the hydride reservoir with the higher equilibrium pressure into the hydride reservoir with the lower equilibrium pressure. This would also cause, in the latter hydride reservoir, an additional hydrogenation with a corresponding release of heat and, in the first reservoir, an additional dehydrogenation with a corresponding cooling. It is therefore appropriate to open the valve 15 at the end of the charge and discharge cycle, when the valves 2, 3, 4 and 13 are closed. The pressure in the already largely discharged hydride reservoir, as a rule, is still significantly higher than in the just-charged hydride reservoir, so that the charging of the latter is further increased, and thereby the amount of hydrogen gas which can be released during the discharge is increased by that amount. Another positive effect is that because of the release or absorption of binding enthalpy of the hydride, the temperatures of the hydride reservoirs very rapidly move in the direction which is required for the next operating cycle, which next operating cycle requires a reversal of the cooling and heating circuit on the other hydride reservoir means. In order not to interfere with this effect, both circuits must either be interrupted during the temporary hydrogen-side short circuit or be already reversed.

Figure 2:
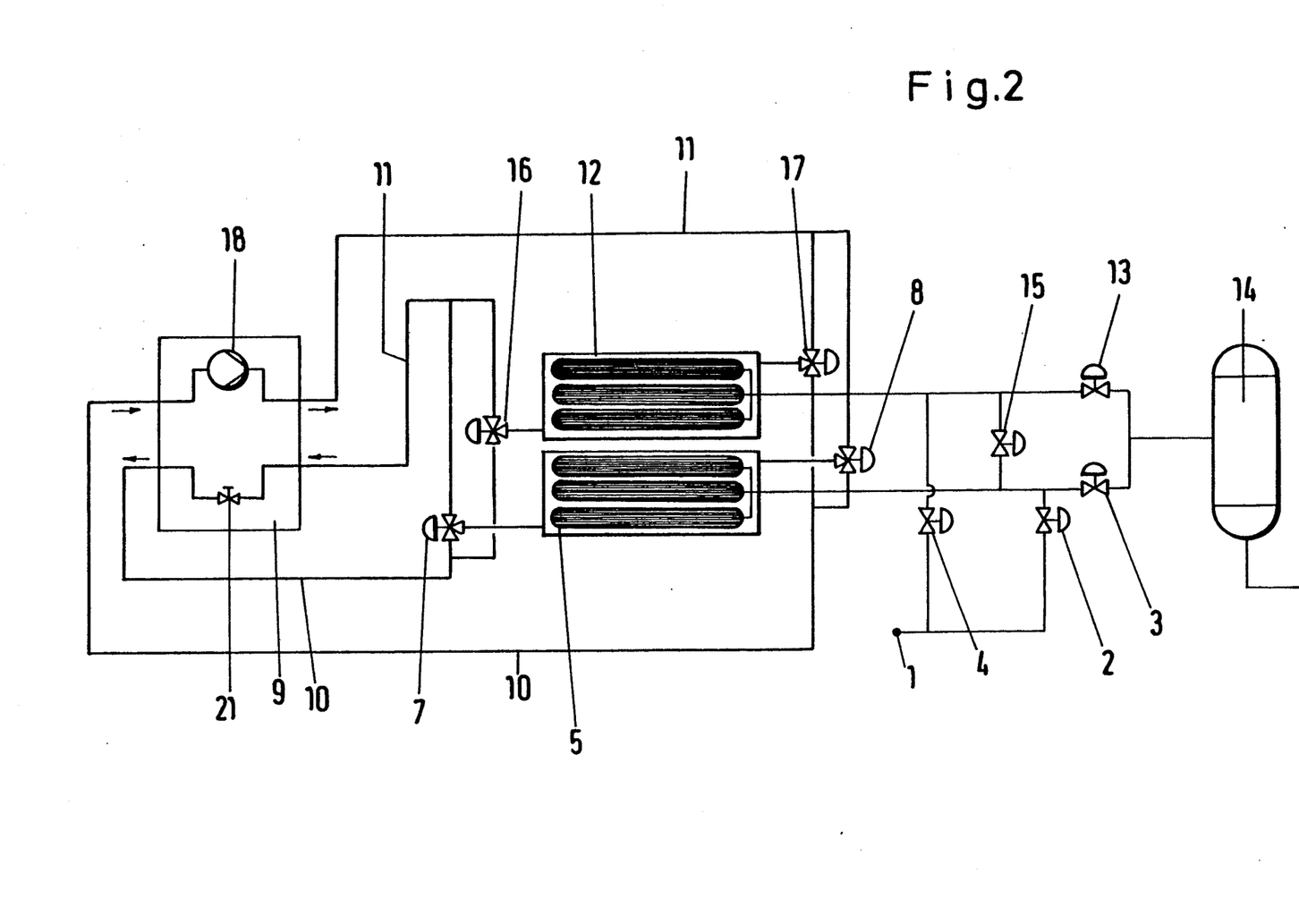
FIG. 2 is a schematic diagram of another preferred compressor apparatus, which is a modified version of the apparatus of FIG. 1, with an integrated heating-/cooling circuit.

The embodiment shown in the schematic diagram in FIG. 2 is similar to the embodiment shown in the schematic diagram in FIG. 1. In contrast to the embodiment in FIG. 1, however, in the embodiment of FIG. 2, no water is used as a medium for the heating circuit 11 and cooling circuit 10. Instead, the coolant from the heat pump 9 is used directly both for heating and cooling the hydride reservoirs 5 and 12. The heating circuit 11 and cooling circuit 10 are no longer separated from one another, but form a common circuit together with the original coolant of the internal circuit of the heat pump 9. The functions of the evaporator and of the condenser are directly shifted into the jackets of the two hydride reservoir means. Accordingly, the coolant flows from the compressor 18, for example, by way of the valve 17, into the jacket of the hydride reservoir 12 acting as the condenser, gives up heat and leaves the jacket of the hydride reservoir 12 by way of the valve 16 on the way to the throttle 21, where the coolant is decompressed and cooled further. It is then introduced by way of the valve 7 into the jacket of the hydride reservoir 5 acting as the evaporator and is heated. Then the heated coolant again exits the jacket of the hydride reservoir 5 and is transported by way of the valve 8 back to the compressor 18 of the heat pump 9.

The valves 7, 8, 16, 17 can be reversed at the appropriate time to cause the jacket of the hydride reservoir 12 to function as the evaporator and the jacket of the hydride reservoir 5 to function as the condenser. The compressed hydrogen is again removed to storage in the hydrogen receiver means or compressed gas container 14 from the appropriate hydride reservoir 5 or 12 as it is produced.

FIG. 3 shows a two-stage compressor installation with the hydride reservoirs 37 and 38 connected in series. As will be seen, one hydride reservoir means will serve as a hydrogen source for the subsequent or next hydride reservoir means. Additionally, the subsequent or next hydride reservoir means serves the hydrogen receiver means for the one, preceding hydride reservoir means. Specifically by way of the line 50, uncompressed hydrogen can be introduced into the hydride reservoir 37 with the valve 47 open and the valve 49 closed and stored as hydride.

To basically produce the desired hydrogenation and dehydrogenation in the respective hydride reservoirs 37, 38, a heat pump 32 is provided which includes an evaporator 30 and a condenser 31. The evaporator 30 is connected to the intermediate cold reservoir 33 of the heat sink means while condenser 31 is connected to the intermediate heat reservoir 34 of the heat sink means.

Through the valves 39 and 40, the hydride reservoir 37 can be connected to the cooling circuit 35 with the intermediate cold reservoir 33. At the same time, the intermediate heat reservoir 34 is connected to the intermediate cold reservoir 33 through the heat pump 32 to serve as the eventual heat sink means for the hydride reservoir 37. When the charging of hydride reservoir 37 is completed, the valve 47 is closed, the valve 49 opened, and valve 48 is closed. To discharge the hydride reservoir 37, the valves 39, 40 are closed to disconnect the cooling circuit 35, and the valves 43, 44 are opened to connect the heating circuit 36 with the intermediate heat reservoir 34. Again, at the same time, the intermediate cold reservoir 33 is connected to the intermediate heat reservoir 34 through the heat pump 32 to serve as the eventual heat sink means for the hydride reservoir 37. The hydride reservoir 37 is thereby heated and its equilibrium pressure increases sharply. The possible ratios are schematically indicated in FIG. 4.

Figure 4:
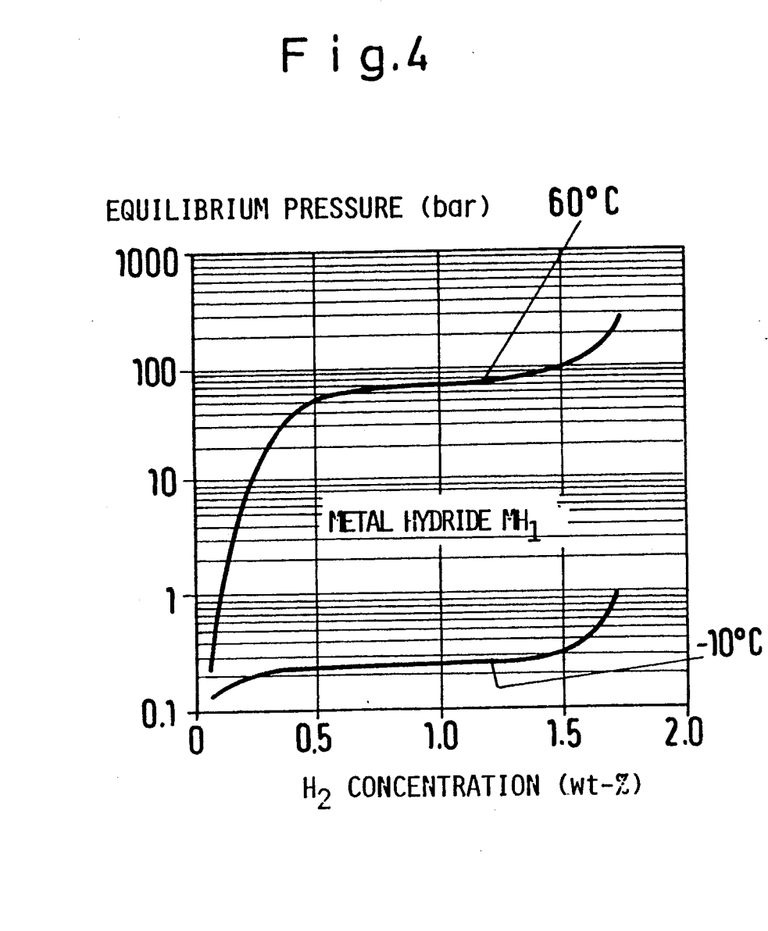
FIGS. 4 and 5 illustrate the equilibrium pressures at given temperatures as a function of the hydrogen concentration for different hydride metals which are respectively employed in the two stages of the apparatus of FIG. 3.

For example, as seen in FIG. 4, if the charging has taken place, at a pressure of approximately 1 bar and a temperature of the reservoir 37 of $-10$ degrees C., a hydrogen concentration of approximately 1.7% by weight is achieved. By increasing the temperature to 60 degrees C., the equilibrium pressure increases to approximately 200 bar.

Figure 5:
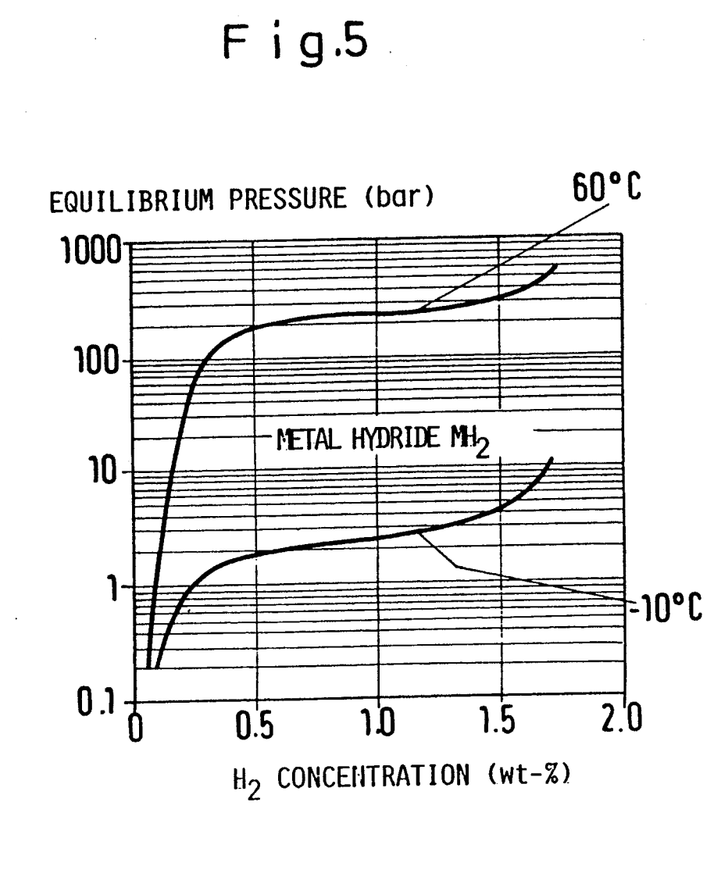

If, thereafter, the hydride reservoir 37 is emptied through the valve 49 into the hydride reservoir 38, there will be a decrease of the hydrogen concentration to approximately 0.2% by weight and its equilibrium pressure will drop to approximately 10 bar. While hydride reservoir 37 is connected to the heating circuit 36, the hydride reservoir 38 is connected through the valves 41, 42 with the cooling circuit 35. At a cooling temperature, for example, of about $-10$ degrees C. and the charging pressure of 10 bar, as shown in FIG. 5, the different hydride-forming metal of the hydride reservoir 38 is brought to a hydrogen concentration of approximately 1.7% by weight. After the completion of the charging of the hydride reservoir 38, the valve 49 is again closed, and a new charging cycle begins for the hydride reservoir 37.

The hydride reservoir 38 is then available to release the highly-compressed hydrogen gas by way of the valve 48. The metal hydride of the hydride reservoir 38, in contrast to that of the hydride reservoir 37, after connection to the heating circuit 36 through the valves 45, 46 at a reservoir temperature also of 60 degrees C. and a hydrogen concentration of 1.7% by weight, produces an equilibrium pressure of several hundred bar, which would only drop to the still very high value of 100 bar at a hydrogen concentration of approximately 0.3% by weight.

This embodiment shows that two or more hydride reservoirs, even with only a few stages sequentially connected in series, can produce very high compressions of hydrogen gas, without requiring a great deal of expense for energy or equipment. This is facilitated in particular by the selection of different metal hydrides for the individual compressor stages. It is thereby possible to use metal hydrides industrially with the same heat source and heat sink operating on different pressure stages. The differences in the binding enthalpies of the different materials and thus the temporal fluctuations of heat and cold requirements can easily be controlled by the above-mentioned intermediate reservoirs for heat and cold. In fact, it has been estimated that this invention makes it possible to reduce the energy required for the operation of a compressor apparatus on a basic hydride reservoir to approximately 20% compared to the conventional method of operation.

In summary, the preferred apparatus for the compression of hydrogen gas includes at least one hydride reservoir, which has a feed line for the hydrogen gas to be compressed and a discharge line for the compressed hydrogen gas. A feed line and a discharge line on its jacket is for a medium for the alternating cooling and heating of the hydride reservoir, whereby the feed line and discharge line of the heating and cooling medium are both parts of a closed heating or cooling circuit respectively. There is at least one circulation pump for the heating/cooling medium and a control for the activation of check valves in the feed and discharge lines for the hydrogen gas and the heating/cooling medium for the alternating charging and discharging of the hydride reservoir or reservoirs. The invention is characterized by the fact that the cooling circuit 10 is connected with the heat exchanger 23 which absorbs heat externally (evaporator) of a heat pump 9, and the heating circuit 11 is connected with the heat exchanger 19 which gives off heat externally (condenser) of the same heat pump.

Additionally, the invention is characterized by the fact that there is at least one pair of hydride reservoirs 5, 12, which are structurally identical in terms of their charging and discharging characteristics, and are cycled in relation to one another in relation to the charging and discharging of hydrogen gas.

In one embodiment, the condenser 30 of the heat pump 32 is indirectly coupled with the heating circuit 35 by means of an intermediate heat sink 33, and the evaporator 32 of the heat pump 32 is indirectly coupled with the cooling circuit 36 by means of an intermediate cold sink 34.

If the cooling circuit 10 and the heating circuit 11 are integrated into the internal coolant circuit of the heat pump 9, the jacket of the hydride reservoir 5, 12 can be alternately operated as the evaporator or condenser of the heat pump 9.

In one embodiment of the invention, the apparatus to produce a higher hydrogen compression is designed in two or more stages. The hydrogen gas discharge line of a hydride reservoir 37 of one stage is connected with the hydrogen gas feed line of a hydride reservoir 38 of the subsequent stage. The connected hydride reservoirs 37, 38 of sequential stages can always be operated in opposite modes. Preferably, the hydride material of one hydride reservoir 37, at the same temperature and charge, has a lower equilibrium pressure than the hydride material of the subsequent hydride reservoir 38.

The invention is also characterized by the fact that the hydride reservoirs 5, 12 connected in parallel and operated in opposite modes can be short-circuited with one another at the end of a charge/discharge cycle on the hydrogen side by means of a valve 15.

A number of U.S. patents disclose details about the functions and operations of hydride reservoirs or the like. Such patents include U.S. Pat. Nos. 3,516,263; 4,039,023 entitled "Method and Apparatus for Heat Transfer, Using Metal Hydrides"; U.S. Pat. No. 4,444,727 entitled "Hydrogen Gas Purification Apparatus"; U.S. Pat. No. 4,523,635 entitled "Metal Hydride Heat Pump System"; U.S. Pat. No. 4,607,826 entitled "Apparatus for Preparing Improved Porous Metal-Hydride Compacts"; and U.S. Pat. No. 4,631,170 entitled "Calcium-Nickel-Misch Metal-Aluminum Quaternary Alloy for Hydrogen Storage". All the patents cited herein are incorporated by reference as if the entire contents thereof were fully set forth herein.

The invention as described hereinabove in the context of a preferred embodiment is not to be taken as limited to all of the provided details thereof, since modifications and variations thereof may be made without departing from the spirit and scope of the invention.

What is claimed is:

1. Apparatus for compressing hydrogen gas comprising:
   a hydrogen source;
   hydrogen receiver means;
   at least one hydride reservoir means;
   said hydride reservoir means having means for receiving said hydrogen gas from said hydrogen source at a first pressure and for discharging said hydrogen gas to said hydrogen receiver means at a second pressure;
   said second pressure being substantially higher than said first pressure;
   said hydride reservoir means including means for supplying a heating and cooling medium thereto and means for discharging said heating and cooling medium therefrom;
   heat sink means;
   heat pump means operably connected to said hydride reservoir means through said means for supplying and said means for discharging said heating and cooling medium and to said heat sink means for selectively cooling said hydride reservoir means while heating said heat sink means and heating said hydride reservoir means while cooling said heat sink means; and
   said heat sink means including means for receiving heat during said heating, means for storing said received heat, and means for releasing a substantial portion of said received heat during said cooling; and
   said heat pump means being configured to provide said heating of said hydride reservoir means for generating a pressure of said hydrogen gas of said hydride reservoir means at least as great as said second pressure.

2. The apparatus according to claim 1, wherein said heat sink means includes an intermediate heat sink and an intermediate cold sink, said heat pump means includes an evaporator and a condenser, said evaporator is connected to said intermediate cold sink of said heat sink means for said cooling thereof, and said condenser is connected to said intermediate heat sink of said heat sink means for said heating thereof.

3. The apparatus according to claim 1, wherein said hydride reservoir means includes a hydride reservoir for reaction with said hydrogen gas therein and a heat transfer means adjacent said hydride reservoir and said heat transfer means includes said heating and cooling medium therein for said heating and said cooling of said hydride reservoir of said hydride reservoir means.

4. The apparatus according to claim 1, wherein said heat sink means includes means for supplying said heating and cooling medium thereto and for discharging said heating and cooling medium therefrom.

5. The apparatus according to claim 4, wherein said heat sink means is a second of said hydride reservoir means.

6. The apparatus according to claim 5, wherein said one hydride reservoir means and said second hydride reservoir means are identical and include means for operating in an opposite manner during said receiving said hydrogen-gas and discharging said hydrogen gas and during said cooling and said heating.

7. The apparatus according to claim 5, further including means for transferring said hydrogen gas from one of said one hydride reservoir means and said second hydride reservoir means to the other of said one hydride reservoir means and said second hydride reservoir means.

8. The apparatus according to claim 4, wherein said heat pump means includes a pump, said heating and cooling medium includes a coolant for being pumped by said pump of said heat pump means, said hydride reservoir means is an evaporator for said heat pump means for said cooling of said hydride reservoir means when said heat sink means is a condenser of said heat pump means and said hydride reservoir means is a condenser of said heat pump means for said heating of said hydride reservoir means when said heat sink means is an evaporator of said heat pump means.

9. The apparatus according to claim 4, wherein said heat pump means includes an evaporator and a condenser.

10. The apparatus according to claim 9, further including an intermediate heat sink and intermediate cold sink, wherein said evaporator of said heat pump means is coupled to said intermediate cold sink which in turn is connected to one of said hydride reservoir means and said heat sink means for said cooling thereof and said condenser of said heat pump means is coupled to said intermediate heat sink which in turn is connected to one of said hydride reservoir means and said heat sink means for said heating thereof.

11. The apparatus according to claim 9, wherein said means for supplying and said means for discharging of said hydride reservoir means and said evaporator are included in a cooling circuit for cooling said hydride reservoir means, said means for supplying and said means for discharging of said heat sink means and said condenser are in a heating circuit for said heating of said heat sink means, said means for supplying and said means for discharging of said hydride reservoir means and said condenser are in said heating circuit for said heating of said hydride reservoir means, and said means for supplying and said means for discharging of said heat sink means and said evaporator are in said cooling circuit for said cooling of said heat sink means.

12. The apparatus according to claim 11, wherein each of said heating circuit and said cooling circuit includes a pump for pumping said heating and cooling medium thereof.

13. The apparatus according to claim 11, wherein said heating circuit and said cooling circuit are respectively isolated to prevent flow of said heating and cooling medium therebetween.

14. The apparatus according to claim 9, wherein said heat sink means is a second of said hydride reservoir means.

15. The apparatus according to claim 1, wherein said hydride source includes at least a second of said hydrogen reservoir means.

16. The apparatus according to claim 15, wherein said one hydride reservoir means has a first hydride-forming material therein, said second hydride reservoir means has a second hydride-forming material therein, said first hydride-forming material is for absorbing and releasing said hydrogen gas at a first range of pressures, said second hydride-forming material is for generally absorbing and releasing said hydrogen gas at a second range of pressures, and said first range of pressures is substantially higher than said second range of pressures.

17. The apparatus according to claim 1, wherein said at least one of said hydride reservoir means includes a plurality of said hydride reservoir means in a sequential series, said hydrogen receiver means of a preceding said hydride reservoir means includes a subsequent said hydride reservoir means and said hydrogen source of said subsequent hydride reservoir means includes said preceding hydride reservoir means.

18. Apparatus for compressing hydrogen gas comprising:
   a hydrogen source;
   hydrogen receiver means;
   a pair of hydride reservoir means;
   each of said hydride reservoir means including a hydride reservoir for reaction with said hydrogen gas therein and a heat transfer means adjacent said hydride reservoir for receipt of a heating and cooling medium therein;
   each of said hydride reservoirs including means for receiving said hydrogen gas from said hydrogen source at a first pressure and for discharging said hydrogen gas to said hydrogen receiver means at a second pressure;
   said second pressure being substantially higher than said first pressure;
   each of said heat transfer means including means for supplying said heating and cooling medium thereto and means for discharging said heating and cooling medium therefrom;
   heat pump means operably connected to each of said heat transfer means of said hydride reservoir means through said means for supplying and said means for discharging said heating and cooling medium for selectively cooling said hydride reservoir of a first of said hydride reservoir means while heating said hydride reservoir of a second of said hydride reservoir means and heating said hydride reservoir of said first of said hydride reservoir means while cooling said hydride reservoir of said second of said hydride reservoir means;
   said heat pump means being configured to provide said heating of said hydride reservoir of said second hydride reservoir means for generating a pressure of said hydrogen gas of said second of said hydride reservoir means at least as great as said second pressure; and
   said heat pump means being configured to provide said heating of said hydride reservoir of said first hydride reservoir means for generating a pressure of said hydrogen gas of said first of said hydride reservoir means at least as great as said second pressure.

19. A method of compressing hydrogen gas, said method comprising the steps of:
   supplying said hydrogen gas at a first pressure to at least one hydride reservoir means;
   transferring heat with heat pump means from said hydride reservoir means to a heat sink means to cause said hydrogen gas to be absorbed in said hydride reservoir means;
   receiving said heat in said heat sink means;
   transferring said heat with said heat pump means to said hydride reservoir means from said heat sink means to cause a discharge of said hydrogen gas at a second pressure which is higher than said first pressure; and
   removing said hydrogen gas at said second pressure from said hydride reservoir means.

20. The method according to claim 19, wherein said transferring said heat includes pumping a coolant of said heat pump means through said hydride reservoir means and said heat sink means.

21. The method according to claim 19, wherein said transferring said heat includes pumping a heating and cooling medium respectively through said hydride reservoir means and said heat sink means and pumping a coolant of said heat pump means through an evaporator and a condenser including said heating and cooling medium as said heating and cooling medium is being selectively pumped through said hydride reservoir means and said heat sink means.

22. The method according to claim 19, further including the step of providing a second of said hydride reservoir means to serve as said heat sink means and said supplying said hydrogen gas at said first pressure is alternatively to said one hydride reservoir means and said second hydride reservoir means while said removing said hydrogen gas at said second pressure is respectively alternatively from said second hydride reservoir means and said one hydride reservoir means.

23. The method according to claim 22, wherein said supplying said hydrogen gas at said first pressure is to said one hydride reservoir means is from a hydrogen source, said receiving said hydrogen gas at said second pressure from said second hydride reservoir means is to a hydrogen receiver means, further including the step of transferring said hydrogen gas at a third pressure between said first pressure and said second pressure from said second hydride reservoir means to said first hydride reservoir means after said supplying and said removing steps are completed.

24. The method according to claim 19, further including the steps of providing a second said hydride reservoir means, said removing said hydrogen gas at said second pressure from said one hydride reservoir means includes supplying said hydrogen gas at a third pressure which is higher than said first pressure to said second hydride reservoir means, transferring heat with said heat pump means between said second hydride reservoir means and said heat sink means to cause said hydrogen gas to be absorbed in said second hydride reservoir means, transferring heat with said heat pump means between said second hydride reservoir means and said heat sink means to cause a discharge of said hydrogen gas at a fourth pressure which is higher than said second pressure and said third pressure, and removing said hydrogen gas at said fourth pressure from said second hydride reservoir means.

* * * * *

UNITED STATES PATENT AND TRADEMARK OFFICE
CERTIFICATE OF CORRECTION

PATENT NO. : 4,995,235

DATED : February 26, 1991

INVENTOR(S) : Clemens Halene

It is certified that error appears in the above-identified patent and that said Letters Patent is hereby corrected as shown below:

On the title page, item [73] Assignee: delete "Huit Gesellschaft Fur-Hydrid-Und Wasserstofftechnik m.b.H." and insert --HWT Gesellschaft für Hydrid-und Wasserstofftechnik m.b.H.--.

On tht title page, directly under the designation of the Primary Examiner, insert --Attorney, Agent, or Firm - Nils H. Ljungman & Associates--.

In column 4, line 26, after 'source', insert --of--.
In column 4, line 55, after 'coolant', insert --of--.
In column 4, line 63, after 'line', insert --28--.
In column 5, line 65, delete "addition al" and insert --additional--.

Signed and Sealed this

Twenty-eighth Day of July, 1992

Attest:

DOUGLAS B. COMER

Attesting Officer

Acting Commissioner of Patents and Trademarks